INVENTORS
DANIEL BLITZ
MARTIN R. RICHMOND
BY Richard J. Seligman
ATTORNEY

INVENTORS
DANIEL BLITZ
MARTIN R. RICHMOND
BY Richard J. Seligman
ATTORNEY

United States Patent Office 3,548,383
Patented Dec. 15, 1970

3,548,383
CORRELATOR FOR DIGITAL SIGNAL PROCESSING
Daniel Blitz, Boston, and Martin R. Richmond, Belmont, Mass., assignors to Sanders Associates, Inc., Nashua, N.H., a corporation of Delaware
Filed Mar. 27, 1967, Ser. No. 626,164
Int. Cl. G11c 11/02
U.S. Cl. 340—172.5                    21 Claims

ABSTRACT OF THE DISCLOSURE

Apparatus is disclosed for identifying and correlating signals, the input information to the apparatus being samples representing a characteristic of the signals as a function of time. The apparatus includes a network(s) of magnetic cores grouped to algebraically sum the samples of the signal(s) to be recognized, to thus produce a maximized output signal when the signal(s) to be recognized is applied thereto.

---

The invention herein described was made in the course of or under a contract or subcontract thereunder with the Department of the Navy.

In many applications there is a requirement for apparatus for preserving the phase/amplitude history of a signal or signals, which apparatus is to be utilized to indicate whether an input signal applied thereto has substantially the same phase/amplitude history as that which is preserved therein, that is, employed as a signal recognition circuit. Applications where such apparatus is required are many. A few of these would be in data processing systems, speech recognition devices, number testing apparatus, radar systems, etc. It is obvious that this list is not all-encompassing of the uses for such apparatus and that many varied applications will be apparent to those skilled in the art.

One such application is disclosed in our co-pending patent application for "Signal Correlation Apparatus," Serial No. 486,140, filed Sept. 9, 1965, pending Group 230. This application references use of a correlator network for improved Doppler radar systems. For example, an exemplary pulse Doppler radar system requires that 250 signals, representing the output of 250 range gates, be simultaneously examined for the presence of Doppler information which indicates target speeds. In such a system, some 40 Doppler filters having 0.5-kilocycle bandwidths are utilized to cover a frequency range from 0 to 20 kilocycles. Each of the 250 signals would therefore have to be processed by 40 Doppler filters. Thus, for a radar system having 250 range gates and 0.5-kilocycle resolution in a 20-kilocycle frequency range, 10,000 filters would be required to process all possible range and Doppler signals. Additionally, each filter output would require its own detection circuit. Systems of this type which require large numbers of components are prohibitively bulky and expensive.

The size and cost are reduced by providing simultaneous storage of a multiplicity of signals, subsequent read-out of each stored signal, and delivery of the read-out signals to correlating networks. The signals are written onto a magnetic core matrix, and the contents of the matrix are correlated with preserved information to identify characteristics of the signals.

Identification of characteristics of an unknown signal or the detection of the presence of a particular characteristic in the multiplicity of received signals is accomplished by matching all such signals to a predetermined program. Correlation of a compared signal with the preserved information of the predetermined program initiates an output indicative of the presence of that particular signal. Such signal correlation is achieved by storing samples of the signal to be examined at various points representing different moments in its history and then summing the sampled points in such a pattern as to duplicate the characteristics of a desired signal. A signal having characteristics matching this pattern will have its summed points adding to produce a peak output, whereas all other signals will sum with a mixed phase and amplitude relationship, resulting in a low output. Various summing patterns, each responding to a particular characteristic of a signal, can be used simultaneously to supply separate outputs.

One typical correlator network disclosed in said patent application Ser. No. 486,140 is connected to a magnetic core matrix in which input signals are applied and stored. The magnetic core matrix comprises as many rows as there are signals to be stored, and a number of columns equivalent to the number of samples to be made of each incoming signal. The correlator network includes a plurality of weighted resistor networks, each coupled to the columns of the magnetic core matrix, with each resistor network arranged to sum separately outputs appearing on the vertical columns as each horizontal row is read out. The total sum can be applied to a threshold detector which, in the event of a substantial correlation between the time, phase and/or amplitude characteristics of a signal as read out of the storage matrix and a particular resistor network, will give an indication.

Resistor correlator networks of the type above mentioned usually require at least one resistor for each column in each resistor network. Therefore, if the signal is to be sampled 200 times, thus requiring 200 columns, and 40 different characteristics of input signals are potentially available, the correlator would require 8,000 resistors; where phase considerations apply, at least double this amount of resistors would be necessary. Such resistor networks provide adequate performance, but are very bulky and expensive.

Accordingly, it is an object of this invention to provide an improved correlator network for signal identification apparatus.

It is another object of this invention to provide a correlator network utilizing magnetic cores.

It is a further object of this invention to provide a correlator network operable with input signals having fractional signal-to-noise ratios.

It is yet another object of this invention to provide a correlator network using toroidal cores having normal linear transformer magnetic characteristics.

It is an additional object of this invention to provide a correlator network of magnetic cores in which core switching apparatus is not required.

The above-mentioned and other features and objects of this invention will become more apparent by reference to the following description, taken in conjunction with the accompanying drawings, in which.

Briefly, the invention provides signal correlation networks for correlating signals applied thereto, which signals are applied to the correlation networks as serially derived samples representing the phase characteristics as a function of time of the signals to be recognized. The correlators include arrangements of magnetic cores grouped to sum the samples of signals having the phase characteristics of the samples to be recognized.

Figure 1:
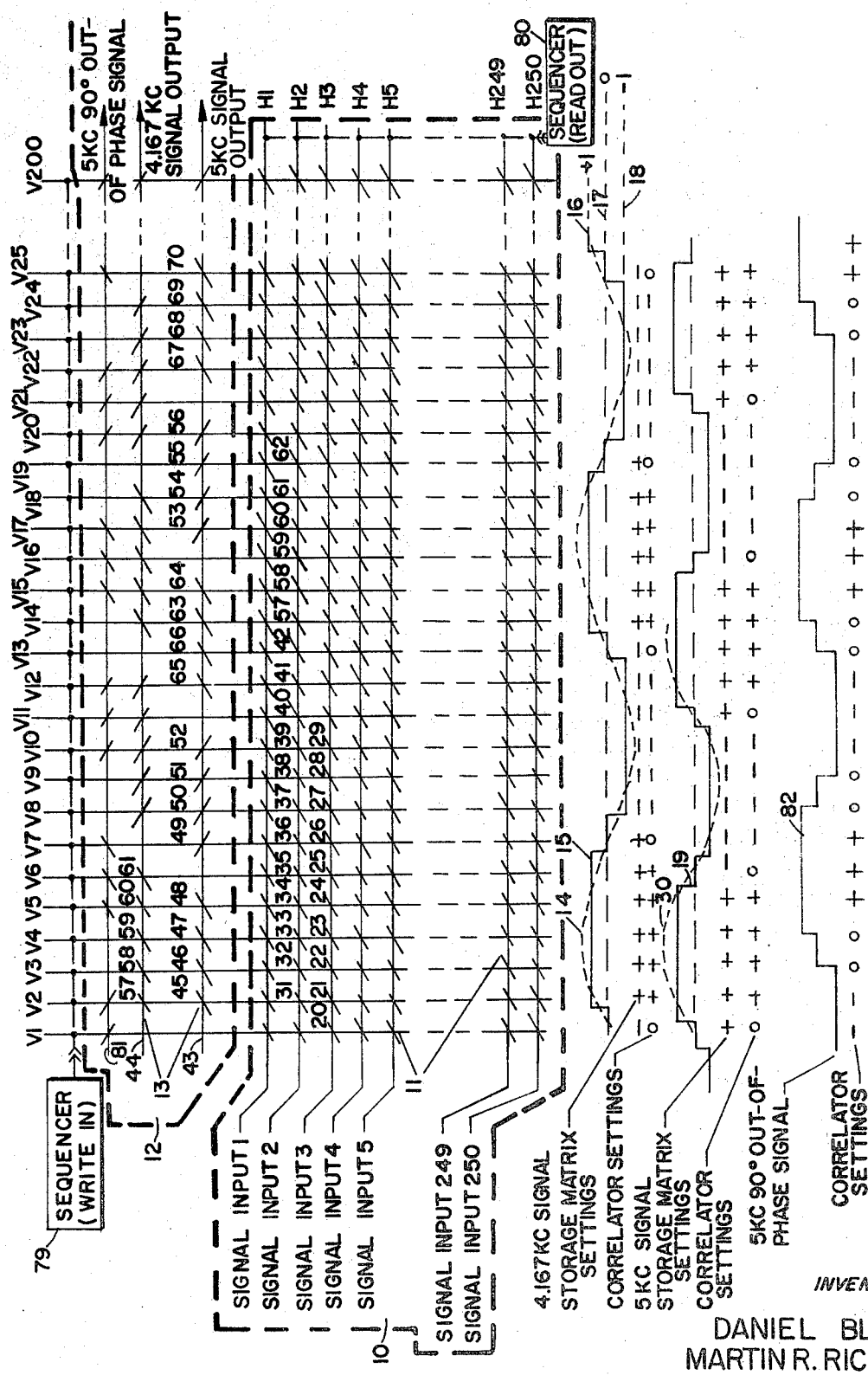
FIG. 1 is a first embodiment of an improved correlator network.

Referring now to FIG. 1, there is illustrated thereby a first embodiment of our invention. The signals to be recognized or correlated are applied to a plurality of horizontal row wires H1 through H250 of a storage matrix 10, comprising a multiplicity of magnetic cores 11 arranged at the intersections of the rows and columns of the matrix. Although matrix 10 is described as having a capability of handling 250 signal trains, this is only for illustration purposes, and more or less signal trains could be handled by merely adding or subtracting a proportional number of horizontal rows. Each core is connected to a particular vertical column V1–V200 of the matrix. Again, the selection of 200 vertical columns is illustrative only, and the number of columns can be increased or decreased in proportion to the number of times the incoming signal is to be sampled.

A signal will be stored (written onto a core 11) when the core is simultaneously excited by an input onto the horizontal row wire and a write pulse from a sequencer 79 onto the respective vertical column. The function of the sequencer is to provide write pulses to the vertical column wires in a serial fashion at the rate at which the incoming signals are to be sampled, and could comprise a simple pulse generator and shift register arrangement. The means for gaining the proper level of signal to be written onto the cores are well-known and are not shown, but could comprise amplifiers, limiters, etc. Reference may be had to the aforementioned patent application, Serial No. 486,140, wherein such equipment is discussed in detail.

The essence of the invention lies in the use of toroidal cores 13 in a correlator 12 which is coupled to storage matrix 10. In the resistor correlator disclosed in the aforementioned earlier filed application, weighted resistors were employed such that the proportion of signal distributed by each resistor within a resistor network would be proportional to the amplitude of the signal at the particular sampling point of the desired incoming signal to be recognized. If the resistors are replaced by small toroidal cores which are wired in a matrix similar to the storage matrix used, the resistance output connectors of the correlator would thereby be replaced by inductive transformer couplings, thus resulting in a matrix which is many times more compact and has fabrication costs which are much less expensive. However, to stimulate the various resistors with their multiplicity of values requires many different types of cores having different output levels. In the alternative, the correlator would incorporate several of the same type core arranged in series or parallel, or else employ multiple-turn couplings on the individual cores.

To eliminate these requirements, the waves of the correlator function have been approximated by three levels of amplitude, consisting of +1, 0, and −1. This is illustrated in the 4.167-kilocycle signal of FIG. 1, where the sine wave 14 has been approximated by a wave having three levels of amplitude (+1) 16, (0) 17, and (−1) 18. Note, the signal shown is a "clean" sine wave; however, as a practical matter, the signal need not be a sine wave and may be buried in noise which, statistically, will tend to provide an equal number of + and −.

At this point, one might conjecture why not approximate the sine wave by two levels of amplitude, that is, a square wave, since in certain applications (Doppler frequency determination, hereinbefore mentioned), the function of the correlating networks is only to select a particular frequency. This would not suffice, since one major feature of the subject invention is the ability to identify the sine wave from a very noisy signal, in fact, where the signal is buried in noise. Noise occurs randomly and can contribute substantially to the amplitude anywhere in time, whereas the portions of signal (e.g., sine wave) close to the axis crossing contribute very little in the way of amplitude; thus, to take advantage of this and enhance signal-to-noise ratios, only the major portions of the sine wave are utilized. The portion of the sine wave where it has a minimum of amplitude is entirely eliminated (30° each side of the zero and 180 degree axis crossovers being selected in this example), thus eliminating an area having very minor signal information, but an area where noise is not reduced. Hence, all the noise in this area is removed, yet there is minimum loss of signal information. Further, another way of visualizing this is that, if the sine wave is approximated by two levels of amplitude, that is, giving square wave response, then the correlators will not only respond to the sine wave frequency of interest but also to odd integral multiples of that frequency, or to noise signals which are odd integral multiples of that frequency, thereby deteriorating the signal-to-noise ratio. The three-level correlator (with 30° each side of the zero and 180 degree axis crossovers eliminated) approximates a sine wave sufficiently to minimize the above-mentioned effects by removing from the response those odd integral multiples of the frequency of interest whose integers are integral multiples of three.

The utilization of such a three-level correlator permits the use of a single toroid type throughout, which is connected for either a plus or minus output, or else omitted entirely at the particular junction of the correlator matrix for the zero level.

The embodiment illustrated in FIG. 1 shows a portion of a correlator network using toroids employing the three-level simulation of a sine wave principle. The correlator 12 herein illustrated shows the placement of cores for the identification or correlation of two signals 14 and 30 (4.167 kilocycles and 5 kilocycles), both of which are sine waves drawn in their three-level simulated form as waves 15 and 19. The bottom rows of characters, below the simulated sine waves, indicate the polarity of the cores within the correlator matrix, that is, whether the core should be wired positive, negative, or should be omitted entirely for that position in the matrix. The waveforms representing the 4.167-kilocycle and 5-kilocycle signals have been drawn in particular relationship to the storage matrix. They are illustrated to represent the approximation of the time polarity characteristics of their respective signals as they would appear on two of the 250 horizontal drive lines, for example, H1 and H2.

Operating procedures for the instant example of the invention require that the vertical drive wires be pulsed in sequence at 20-microsecond increments. The total time, therefore, to pulse the 200 vertical drive wires, is 4 milliseconds. Since a 5-kilocycle signal will alternate polarity every 100 microseconds, signal waveform 19 has been illustrated alternating after every fifth vertical drive wire shown in FIG. 1. Likewise, 4.167-kilocycle signal 15 is illustrated as alternating after every sixth vertical drive wire.

In operation, the magnetic cores 11 of storage matrix 10 are initially energized in one direction, and considered to be in a 0 state. The design parameters of the apparatus are such that, in order to energize any magnetic core into an opposite state (a 1 state), it will require the coincidence of a positive signal pulse and a write pulse. That is, to change any magnetic core in the matrix from the 0 state to the 1 state, approximately half of the energy required is supplied from the signal on the horizontal drive wire and half from the write pulse, either signal by itself being insufficient to change the state of a core. Since these signals must be coincident, each core is effectively an AND gate. Assuming now that all cores in the storage matrix are in a 0 state and signals 15 and 19 are appearing on horizontal drive lines H1 and H2 respectively, sequential pulsing of the vertical drive wires at 20-microsecond increments will register the time polarity characteristics of said signals in the storage matrix. This is accomplished as follows: During the first 100 microseconds and, consequently, the first five pulses, horizontal drive wire H2 is positive; and coincidence between this positive condition of the drive wire and the write pulses is effective to energize magnetic core 20 through 24 and place them in a 1 state. During the next 100 microseconds, horizontal drive wire H2 is in a negative condition and, there being no coincidence of positive pulses and write pulses, the magnetic cores 25 through 29 are not energized and remain in a 0 state. The remaining magnetic cores on drive wire H2 will be energized or not energized in the same manner, while the write pulses sequence through vertical drive wire V200. Simultaneously, the signal 14 is being written into the storage matrix on horizontal drive wire H1. In this instance, however, because of the lower frequency of the signal, the horizontal drive wire is in a positive condition for a longer period of time, and consequently six magnetic cores (cores 31 through 36) are energized and placed in a 1 state; and the next six magnetic cores, 37 through 42, remain in a 0 state. The time polarity characteristics of the two signals have thus been stored in the storage matrix.

In accordance with the principles of the invention, various summing networks of correlator 12 are connected to the vertical drive wires. In the example of FIG. 1, two such summing networks are illustrated, one being responsive to a 5-kilocycle signal and the other to a 4.167-kilocycle signal. These summing networks comprise connections through toroids to certain selected vertical drive wires in combinations designed to establish coincidence with the time phase characteristics of given signals. For instance, horizontal wire 43, together with appropriate toroids, comprises a summing network adapted to detect a 5-kilocycle signal; and wire 44 and the toroids associated therewith comprise a summing network adapted to detect a 4.167-kilocycle signal. The toroids of the summing networks are wired in a positive fashion to correlate positive portions of the signals to be recognized and in a negative fashion to correlate negative portions of the signals to be recognized. Where the summing networks are to correlate near the zero degree crossovers of the signals to be recognized, toroids are omitted; that is, the horizontal wires of the correlator do not couple any toroids at these points. Each correlation network is wired to recognize a particular signal.

However, it should be noted that either of the arrangements shown can be made equivalent to any other arrangement of like numbers of positive and negative samples, merely by changing the sequence in which the vertical wires are pulsed during the write cycle to conform to the new arrangement.

In reading out storage matrix 10, horizontal drive wires H1 through H250 are pulsed successively by read-out pulses from a read-out sequencer 80, which could be combined with sequencer 79. When a substantially large read-out pulse is applied to a horizontal drive wire, the magnetic cores in the particular row which have been previously energized and placed in a 1 state are de-energized and placed back in a 0 state. This is a destructive read-out, which causes pulses to appear on appropriate vertical drive wires. These pulses are then summed by the summing network. Magnetic cores that had been in a 0 state are unaffected by the read-out pulse, and no signal appears on those vertical wires. In the event that the time phase characteristics of the signal derived from the horizontal drive wires coincide with a particular summing network, a maximum signal output from the summing network will be obtained. For example, when horizontal drive wire H2 of FIG. 1, containing the time phase characteristics of 5-kilocycle signal 30, is pulsed with a read-out pulse, positive pulses from cores 21 through 24 will drive toroids 45 through 48 of the summing network. No toroid is at the V1 intersection of line 43, since the three-level approximation is used (wave shape 19), and this column is within ±30° of the zero degree crossover, which points are set at zero as described hereinbefore. There will be no pulses from cores 25 through 29, as they have been in a 0 state resulting from the negative phase of the signal. The remaining groups of correlator toroids will be driven by the output of the remaining magnetic cores of horizontal drive wire H2 in the same manner.

Referring to waveform 30 of the 5-kilocycle signal, it will be noted that the notations appearing below the waveform coincide with vertical drive wires. The plus and minus notations for the storage matrix settings indicate the polarity of the signal on horizontal drive wire H2 at the particular instant in time of the written-in signal, and hence the condition of the respective magnetic cores residing on the wire. That is, cores on drive wire H2 which correspond to plus notations have been put in a 1 state, and cores corresponding to minus notations remain in a 0 state. As read-out wire 43 of the 5-kilocycle signal summing network is connected through toroids to the vertical wires passing through the cores of matrix 10 which are in the 1 state, it will sum 12 pulses from vertical wires V1–V25 when horizontal drive wire H2 is read out (from toroids 45–58, 63–66, and 67–70). Note, a core represented by a slant line making an acute angle to the right is a core providing positive pulse output when switched, while a core represented by a slant line making an acute angle to the left provides a negative output. Toroids 49–52 and 53–56 will contribute no negative pulses when horizontal drive wire H2 is read out, since all connections thereto are made to vertical drive wires which connect to magnetic cores residing in a 0 state at the time of pulsing, thus producing no pulses when horizontal row H2 is read out. There will therefore be no inverted pulses to subtract from the 12 pulses summed by read-out wire 43. This of course may be extrapolated over the entire 200 vertical drive wires to provide maximum output, as would be expected from an exactly coinciding signal.

An examination of waveform 14 of the 4.167-kilocycle signal and its time polarity relationship with the summing network comprising line 44 and the associated toroids will reveal that a similar maximum signal output will be obtained. The first positive half-cycle of signal 14 will energize six magnetic cores of matrix 10 and provide six successive pulses, five of which will be sensed and summed by toroids 57 through 61 when horizontal drive wire H1 is readout; and each succeeding positive half-cycle of the signal will provide six pulses, five of which will be summed by appropriate toroids when H1 is read out. It is thus apparent that the coincidence of a signal of a particular frequency with a correlation network of such particular frequency will produce a maximum output signal.

Signals which do not coincide with the correlation networks will cause the outputs from the various groups of toroids to be of mixed polarity which, over the 200 vertical drive wire span of the device, will substantially cancel each other out to provide a very low signal output, if any. This is illustrated by comparing the 4.167-kilocycle signal of FIG. 1 with the 5-kilocycle signal correlation network. In this instance, magnetic cores 31 through 36 and 57 through 62 are energized or put into a 1 state when the 4.167-kilocycle signal is written into a horizontal drive wire H1. When horizontal drive wire H1 is read out, pulses appear on vertical wires V2 through V7 and V14 through V19. Toroids 45, 46, 47, 48, 63 and 64 are driven positively by the pulses appearing on vertical wires V2, V3, V4, V5, V14 and V15, and toroids 49, 53, 54, and 55 are negatively set by the pulses appearing on V7, V17, V18 and V19. There are no cores on lines V6 and V16 to be acted upon, since these lines have zero correlator settings for a 5-kilocycle signal. The six positive outputs from toroids 45, 46, 47, 48, 63, and 64 are summed with the four negative outputs from toroids 49, 53, 54 and 55, with the net result being a small positive output, most of the outputs having cancelled each other. This type of cancelling out of outputs will occur throughout the entire span of the 200 vertical drive wires. Although some measurable output is produced, the cancellation effects above described insure that such an output will be well below the threshold level of system threshold detectors.

The signal storage and correlation apparatus and the operation thereof as described have been based on the assumption that signals being written into the storage device are in a particular phase relationship with the write-in pulse sequencer. That is, at the moment the first vertical drive wire is pulsed, the signal appearing on horizontal drive wire H1 is just going positive or beginning its positive half-cycle. This, of course, will not always be the case. But it is possible to provide other correlation networks suitable to detect the presence of particular signals of other phase relationships with respect to the pulsing sequence of the vertical drive wires.

A signal that is 180° out of phase with respect to the pulsing sequence of the vertical drive wires will provide a similar summation to that of an in-phase signal, although of negative polarity.

The worst possible situation, as far as the correlation network illustrated in FIG. 1, is the 90° out-of-phase signal. Over the course of the entire 200 vertical drive wires, the pulses for the 90° out-of-phase signal will substantially cancel themselves to provide a below-threshold output. In order to compensate for this out-of-phase component which ordinarily would not be detected by the correlation network, a second correlation network can be provided. Such a network is illustrated in FIG. 1 by horizontal output line 81 and its associated cores. This arrangement is designed to coincide exactly with the 5-kilocycle 90° out-of-phase signal 82, and will provide maximum output. The output will be identical, but negative, if the input is a 5-kilocycle 270° out-of-phase signal.

If such a 90° correlation network is added for each expected signal, then the worst possible situation would be a 45°, 135°, 225°, or 315° out-of-phase signal, but these situations will still provide signals having an amplitude which is a substantial proportion of the amplitude of an in-phase signal. The output of such a correlation network for a 45° out-of-phase signal is, in most instances, adequate to be detected by the threshold detectors of the system. Comparable outputs for a 135°, 225°, or 315° signal will be produced by either the in-phase or 90° out-of-phase networks. Should a higher output for out-of-phase signals be required, it is only necessary to provide additional summing networks in different phase relationship. For instance, instead of a single additional 90° out-of-phase summing network, two 60° out-of-phase summing networks could be used. These out-of-phase correlation networks are disclosed in our patent application Serial No. 486,140 with resistor correlator networks. The resistor out-of-phase correlation networks employed therein could be replaced by toroid correlators according to the principles set forth in this invention.

The use of standard magnetic memory cores in correlator 12 necessitates that means such as driving amplifiers be provided to set the cores. Further, means must be provided to reset the cores at the end of each read-out. Hence, in the preferred embodiments of the invention, the cores 13 employed are of the type having normal linear transformer magnetic characteristics, since core switching is not required in the correlator networks; and consequently, vertical driving amplifiers, as well as reverse current drivers, can be eliminated.

Figure 2:
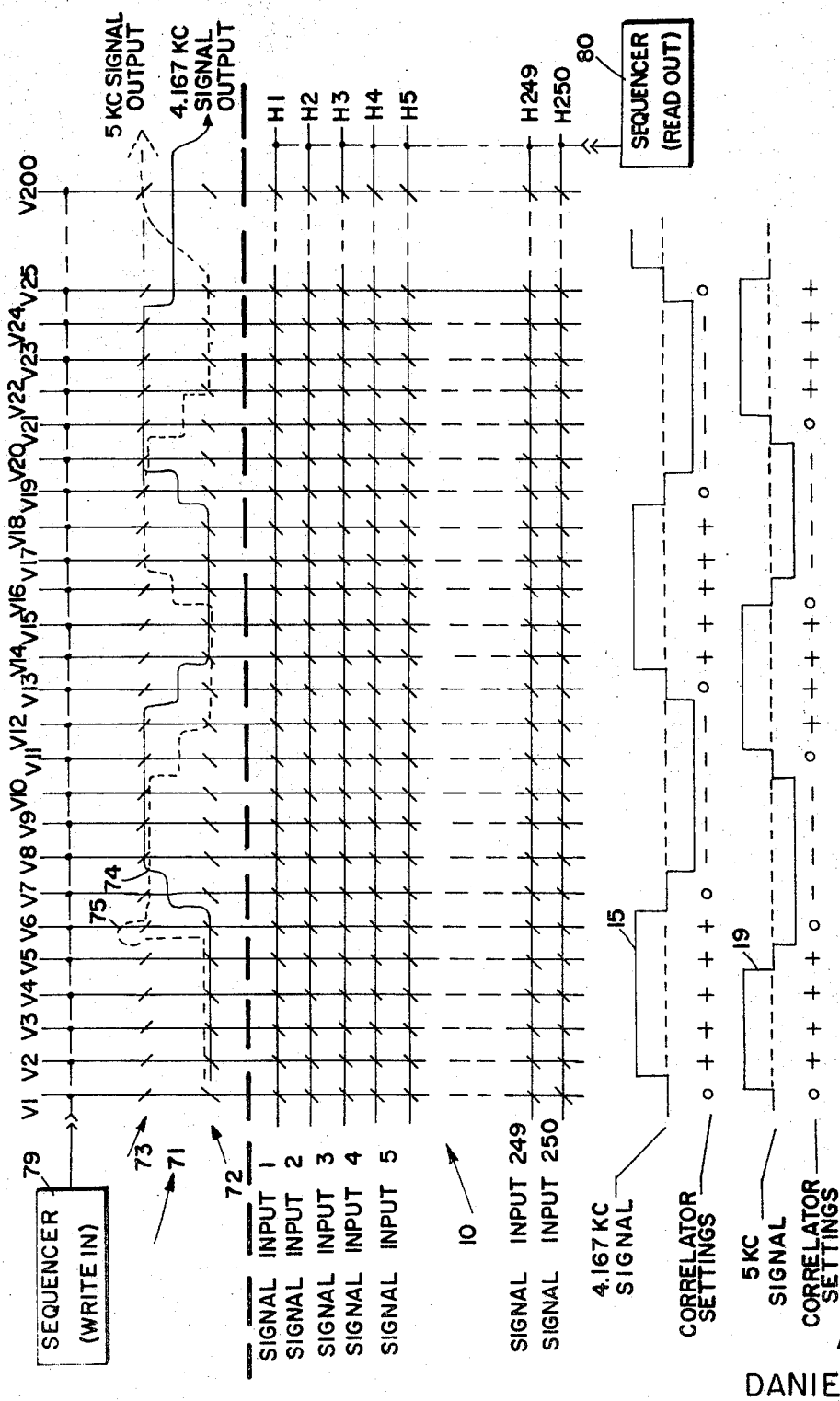
FIG. 2 is a second embodiment of an improved correlator network.

Referring now to FIG. 2, there is illustrated thereby a second embodiment of our invention. As in the earlier described embodiment, a storage matrix 10, having 200 vertical columns and 250 horizontal rows with a magnetic core at the intersection of each vertical column and horizontal row, is employed to store the incoming signal to be recognized. As before, two incoming signals (4.167-kilocycle and 5-kilocycle) are shown for illustration purposes. The 4.167-kilocycle signal, which has a sine wave configuration, is illustrated in its three-level approximation 15, and the 5-kilocycle signal is illustrated in its three-level approximation 19. The signals are applied to horizontal rows H1 and H2 respectively. The method of storing the phase history of the two signals in storage matrix 10 is identical to that already described with respect to the embodiment of FIG. 1. The principal difference of this embodiment lies in the construction of a correlator network 71.

In the embodiment of FIG. 1, a summing network of a multiplicity of cores was provided for each of the 40 signals to be recognized. Approximately 150 cores would be required for each signal to be recognized, thus requiring in excess of 6,000 magnetic cores. In the embodiment of FIG. 2, two cores are utilized for each sample to be taken, regardless of the number of signals. That is, as illustrated, only 400 cores are necessary, since 200 samples are required. Two rows of cores are employed in correlator 71. One row 72 delivers positive outputs when excited by signals from storage matrix 10, and the other row 73 delivers negative outputs upon being excited by outputs from appropriate cores of matrix 10. The desired outputs are achieved by threading each of the 40 correlation read-out wires through selected ones of the same 200 pairs of cores. Each correlation wire is coupled to each vertical sense wire by being threaded through a core of either positive or negative output, or else skipping a core completely for a zero output. Correlation read-out wires 74 and 75 are shown threaded through the rows of cores 72 and 73 so as to provide recognition of the stored input signals 14 and 30, respectively. The correlation wires are threaded through positive and negative cores in the same order as hereinbefore described with respect to the embodiment of FIG. 1. The correlator core settings are illustrated below the three-level simulated waveforms 15 and 19. Taking the 4.167-kilocycle signal for example, on column VI the simulated value is zero, and hence the correlation wire 74 does not pass through either of the cores of this column. For columns V2 through V6, the simulated level is $+1$, and thus correlation wire 74 is illustrated as passing through the positive cores of columns V2 through V6. At line V7, again the simulated level setting is zero, and so the cores found in column V7 are not threaded by correlation wire 74. The simulated settings for columns V8 through V12 are $-1$, and thus correlation wire 74 passes through the negative cores of these columns. In a similar fashion, correlation wire 74 is passed through the cores of the remaining of the 200 vertical columns. This same procedure is employed for the remaining 39 correlations, sharing the same sets of cores.

Out-of-phase correlation networks can be employed in this embodiment according to the principles hereinbefore set out with reference to the embodiment of FIG. 1.

Figure 3:
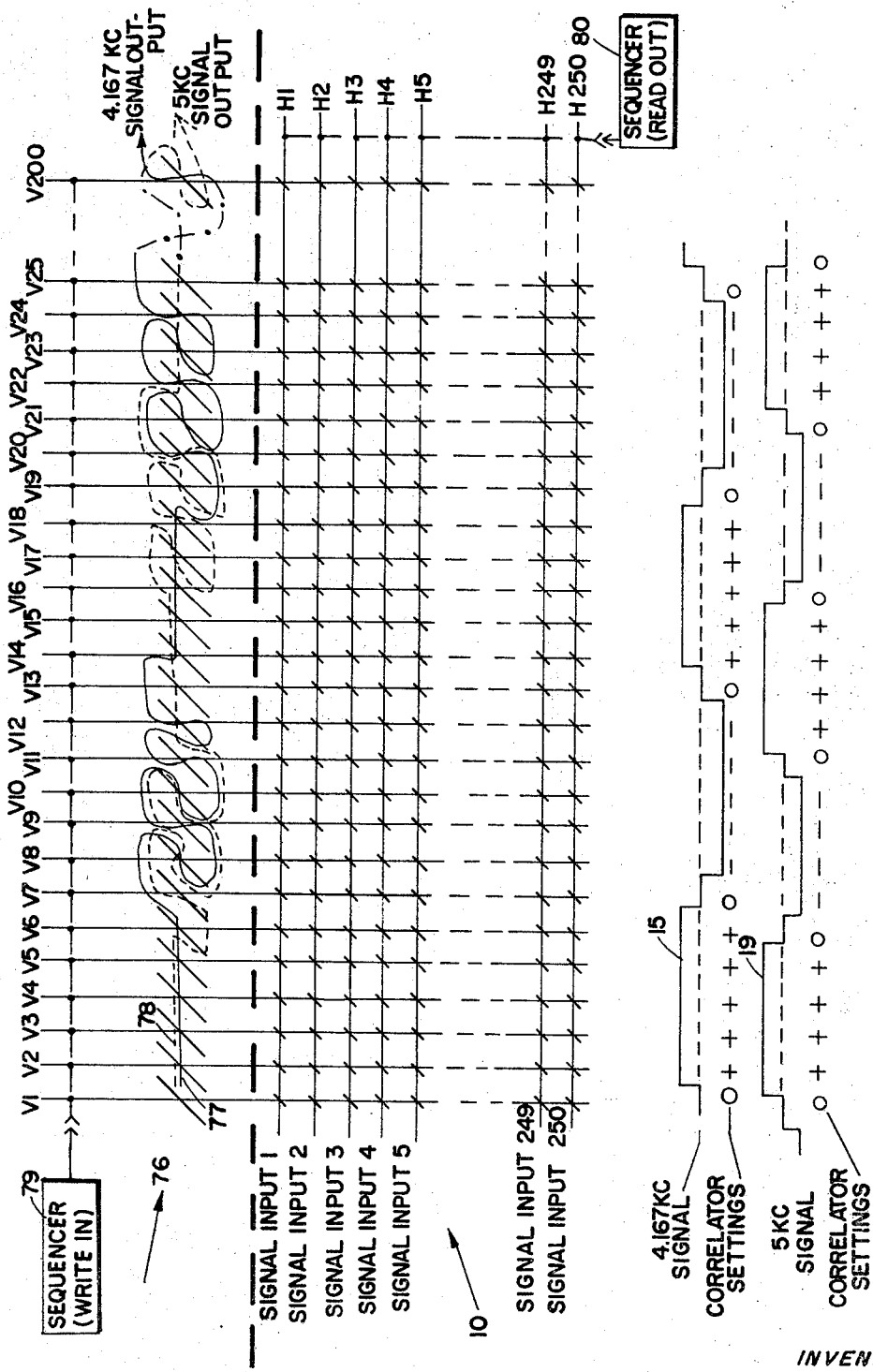
FIG. 3 is a third and preferred embodiment of an improved correlator network.

Referring now to FIG. 3, there is illustrated thereby a third, and preferred, embodiment of the invention. Matrix 10 and the 4.167-kilocycle and 5-kilocycle signals are identical with those described hereinbefore. The essence of this embodiment lies in the fact that only 200 cores are required for a correlator 76, one-half the amount required for the embodiment of FIG. 2. The number of cores required for correlator network 76 is independent of the number of signals to be recognized and depends solely on the number of samples which are to be taken. Thus, a compact, inexpensive, highly reliable correlator unit is the result. In this embodiment, the output polarity of the cores is determined solely by the direction in which the correlation read-out wires pass through the cores. The cores can be positively fixed, and an assembler need only thread the wires in a prescribed manner. Correlation read-out wires 78 and 77 represent the manner in which the correlation read-out wires for the 5-kilocycle and 4.167-kilocycle signals are threaded through the cores, respectively.

The calculation for the threading sequences is very simple, since the correlation wire is threaded through a positive core for signal correlation angles between 30° and 150°, through a negative core for angles between 210° and 330°, no core for all other angles. Since, in the embodiment illustrated, a multiplicity of calculations is required, to determine the phase angle of each signal at each core the computation would be extremely laborious; and it is advantageous for the calculations to be programmed for a digital computer. Such a program was executed, and the computer completed the calculations for the entire threading pattern of all the wires in less than one second. Again, out-of-phase correlator networks can be added to this embodiment as well.

The inputs to the system (matrix 10) are samples of the signals to be recognized, said samples being taken at 20 microsecond intervals in the illustrated embodiments. Therefore, for a particular signal it is readily known what portion of said signal (relative phase angle) will be stored within a particular vertical column core. For example, take the 5 kc. signal illustrated. It is known that a 5 kc. signal has a period of 0.2 millisecond or 200 microseconds. Therefore each cycle of 5 kc. signal is sampled 10 times (200/20). If it is assumed the first sample is taken at the 0° crossover point, then additional samples will be taken every 36° (360/10). That is the first sample is at phase angle 0°, the second at phase angle 36°, the third at 72°, the fourth at 108°, the fifth at 144°, the sixth at 180°, the seventh at 216°, the eighth at 252°, the ninth at 288° and the tenth at 324°. It is further known that the 36°, 72°, 108°, and 144° samples are positive and the 216°, 252°, 288° and 324° samples are negative, assuming the signal starts positively going. The correlating network is, thus, set up to match this polarity sampling (noting that correlating cores are not used 30° either side of the 0° and 180° crossover). Thus, the cores of the correlator are wired as follows to recognize a 5 kc., signal. Column VI—no core wired since sample is 0°±30°, Column V2—positive, Column V3—positive, Column V4—positive, Column V5—positive, Column V6—no core wired since sample is 180°±30°, Column V7—negative, Column V8—negative. Column V9—negative, Column V10—negative etc. Wire 78 of FIG. 3 follows this sequence.

Although the embodiments illustrated show magnetic cores, and more particularly cores having normal linear transformer magnetic characteristics, as the elements excited by the outputs from the storage matrix, the principles of the invention could accommodate any element having multi-level characteristics (devices which can provide more than one output level), such as a bi-stable or astable device. Twisters, aperture plates, capacitors, etc. represent elements which can be used.

Thus, it is to be understood that the embodiments shown are illustrative only, and that many variations and modifications may be made without departing from the principles of the invention herein disclosed and defined by the appended claims.

What is claimed is:

1. Apparatus for signal identification, comprising:
  an orthogonal storage matrix including a multiplicity of bi-stable logic elements arranged in rows and columns, an electrical conductor coupled to said logic elements of each row, and an electrical conductor coupled to said logic elements of each column;
  means for applying signals to said conductors coupling said rows of said logic elements;
  means for first sequentially applying write pulses to said conductors coupling said columns of logic elements;
  means for subsequently sequentially applying read-out pulses to said conductors coupling said rows of logic elements, whereby pulses representing time-polarity samples of signals applied to said last-named conductors are delivered to said conductors coupling said columns of logic elements; and
  a signal correlation network including at least one group of elements having linear transformer magnetic characteristics coupled to selected ones of said conductors connecting said columns of logic elements for generating positive or negative signals in response to signals delivered to said conductors coupling said columns of logic elements, such that a maximum signal will be generated by said group of transformer elements for an in-phase and 180 degree out-of-phase particular signal.

2. Apparatus for signal identification, comprising:
  storage means for storing the polarity of a signal at a number of sampled times in its history, said storage means having a number of output lines;
  a signal correlation network including at least one group of elements having linear transformer magnetic characteristics coupled to selected ones of said output lines for generating positive or negative outputs in response to signal samples presented thereto, such that a maximum signal will be generated by said group of elements when samples of a signal having the particular characteristic to be correlated are applied to said signal correlation network; and
  means for simultaneously applying the samples of a signal from said storage means to said correlation network.

3. Apparatus as in claim 2, said signal correlation network further including at least one group of elements having linear transformer magnetic characteristics responsive to out-of-phase signals having the particular characteristic to be correlated.

4. Apparatus as in claim 2, wherein said group of elements having linear transformer magnetic characteristics is coupled to each of said output lines, further including a plurality of correlation lines each coupled to selected ones of said elements, the selection being dependent upon the input signal to be correlated at each correlation line.

5. Apparatus as defined in claim 4, in which said group of elements includes a pair of elements having linear transformer magnetic characteristics coupled to each of said output lines, one of said pair coupled for generating a positive output and the other coupled for generating a negative output.

6. Apparatus as defined in claim 5, further including at least one group of elements having linear transformer magnetic characteristics coupled to said output lines and responsive to out-of-phase signals having the particular characteristic to be correlated.

7. Apparatus as defined in claim 4, in which only one element having linear transformer magnetic characteristics is coupled to each of said output lines, said correlation lines being coupled to selected ones of said elements for providing positive or negative pulses thereon when said selected elements are switched by signals on said output lines.

8. Apparatus as defined in claim 7, further including at least one group of elements having linear transformer magnetic characteristics coupled to said output lines and responsive to out-of-phase signals having the particular characteristic to be correlated.

9. Apparatus as defined in claim 2, one group of elements having linear transformer magnetic characteristics being employed for each said signal to be recognized.

10. Apparatus as defined in claim 9, in which elements of each group of said elements having linear transformer magnetic characteristics are coupled to said output lines to provide positive outputs when switched during the positive portions of said particular input signal to be recognized when said input signal is properly phased to said correlation network, and to provide negative outputs when switched at all other times, no signal samples being applied to said output lines when said signal to be recognized is negative.

11. Apparatus as defined in claim 9, in which elements of each group of said elements having linear transformer magnetic characteristics are coupled to said output lines for providing positive outputs when switched during the major positive portions of said particular input signal to be recognized when said particular input signal is phased to said correlation network, and for providing negative outputs when switched during the major negative portions of said particular signal to be recognized, no signal samples being applied to said output lines when said signal to be recognized is negative, and no elements being coupled to output lines when said signal is at or near its zero degree and 180 degree crossovers.

12. Apparatus as defined in claim 2 wherein said signals to be recognized have substantially sinusoidal configurations, only one pair of elements having linear transformer magnetic characteristics being coupled to each of said output lines, one element of each of said pairs being arranged to provide positive outputs when switched by signals incident at said output lines, the other element of each of said pairs of elements being arranged for providing negative outputs when switched by signals incident at said output lines.

13. Apparatus as defined in claim 12, further including a plurality of correlation lines coupled to selected ones of said elements, each correlation line arranged to sum outputs from said selected ones of said elements to produce signals which are maximized when samples of said particular signals are incident at said output lines.

14. Apparatus as defined in claim 13, in which said correlation lines are coupled to positive pulse producing elements coupled to output lines at which the samples of said signals to be recognized will be derived from the positive portions of said signals and to negative pulse producing elements coupled to said output lines at which negative portions of signals to be recognized are incident, no signals being applied to said output lines when said signals to be recognized are negative.

15. Apparatus as defined in claim 13, in which said correlation lines are coupled to positive pulse producing elements coupled to output lines at which the samples of the signals to be recognized will be derived from the major positive portions of said signals and to negative pulse producing elements coupled to said output lines at which major negative portions of said signals to be recognized are incident, no samples being applied to said output lines when said signals to be recognized are negative, and no elements being coupled to output lines when said signal is at or near their zero degree and 180 degree crossover points.

16. Apparatus defined in claim 15, in which each of said correlation lines is coupled to a positive pulse producing element for angles of said signals to be recognized between 30° and 150°, to a negative pulse producing element between 210° and 330°, and to no element for all other angles.

17. Apparatus as defined in claim 2 wherein said signals to be recognized have substantially sinusoidal configurations, only one element having linear transformer magnetic characteristics being coupled to each of said output lines.

18. Apparatus as defined in claim 17, further including a plurality of correlation lines coupled to selected ones of said elements, each correlation line arranged to sum outputs from said selected ones of said elements so as to produce a maximized signal when a signal having the characteristics to be correlated is incident at said output lines.

19. Apparatus as defined in claim 18, in which said correlation lines are coupled to positive pulse producing elements coupled to output lines at which the samples of the signals to be recognized will be derived from the positive portions of said signal, and to negative pulse producing elements coupled to said output lines at which negative portions of said signal to be recognized are incident, no samples being applied to said output lines when said signal to be recognized is negative.

20. Apparatus as defined in claim 18, in which said correlation lines are coupled to positive pulse producing elements coupled to output lines at which the samples of the signals to be recognized will be derived from the major positive portions of said signal, and to negative pulse producing elements coupled to said output lines at which major negative portions of said signal to be recognized are incident, no samples being applied to said output lines when said signal to be recognized is negative, and no correlation lines being coupled to elements when said signal to be recognized is at or near zero degree and 180 degree crossover points.

21. Apparatus as defined in claim 19, in which each of said correlation lines is coupled to a positive pulse producing element for angles of said signal to be recognized between 30° and 150°, to a negative pulse producing element between 210° and 330°, and to no element for all other angles.

References Cited

UNITED STATES PATENTS

| | | | |
|---|---|---|---|
| 2,924,812 | 2/1960 | Merritt et al. | 340—146.3 |
| 2,997,705 | 8/1961 | Freedman | 340—174M |
| 3,149,308 | 9/1964 | Lehan et al. | 340—146.3 |
| 3,178,582 | 4/1965 | Crane | 340—146.3 |
| 3,222,645 | 12/1965 | Davis | 340—146.2 |
| 3,239,832 | 3/1966 | Renard | 340—172.5 |
| 3,286,238 | 11/1966 | Steinbuch et al. | 340—172.5 |
| 3,346,844 | 10/1967 | Cott et al. | 340—72.5 |

PAUL J. HENON, Primary Examiner

R. F. CHAPURAN, Assistant Examiner

U.S. Cl. X.R.

340—146.3